March 18, 1969     B. D. BEDFORD     3,434,030
TRANSFORMER COUPLED TIME RATIO CONTROLLED CIRCUITS
Original Filed Sept. 14, 1964     Sheet 1 of 8

Inventor:
Burnice D. Bedford,
by Donald R. Campbell
Attorney.

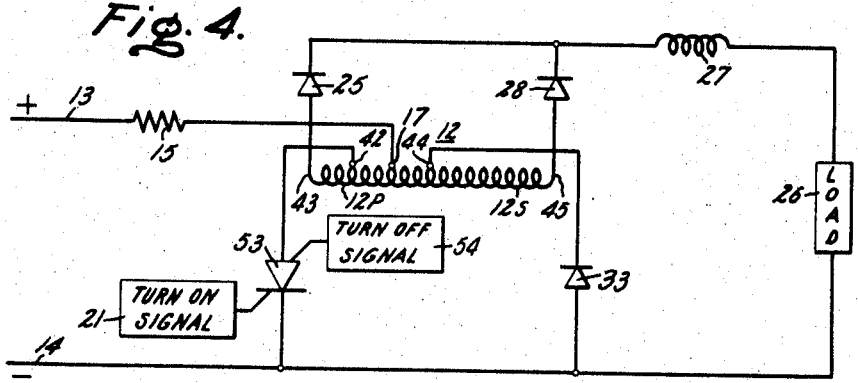
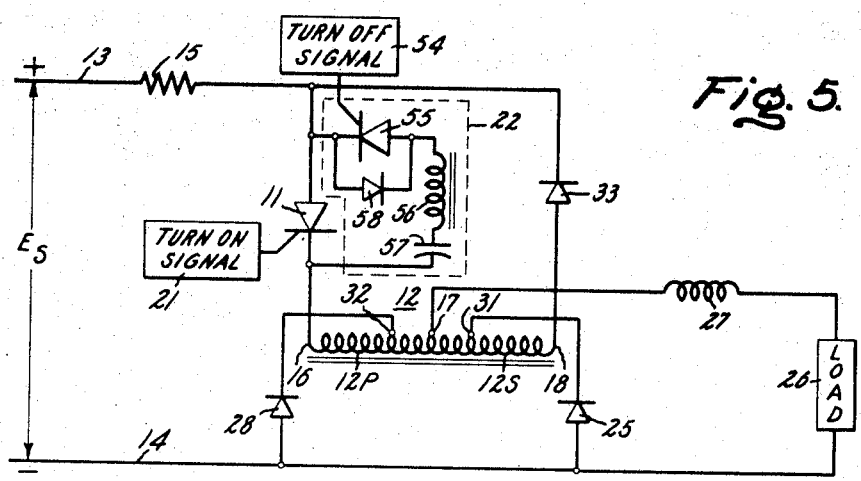
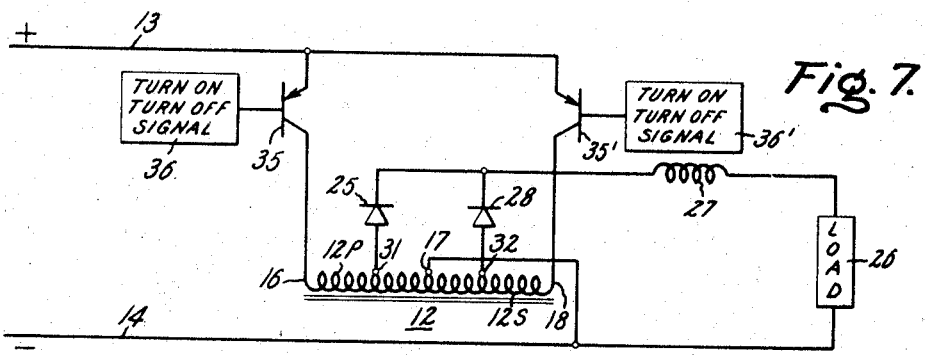

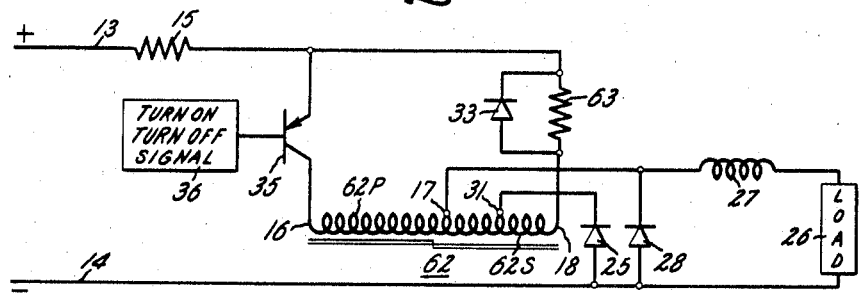
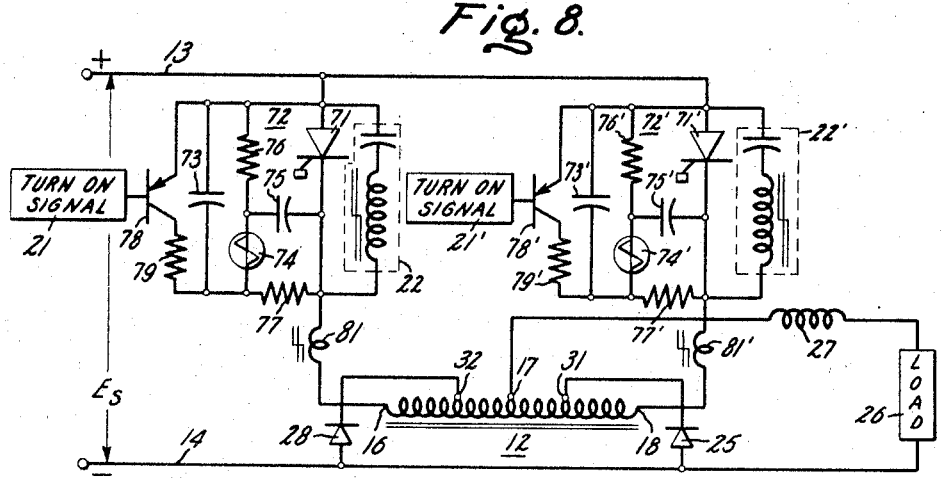
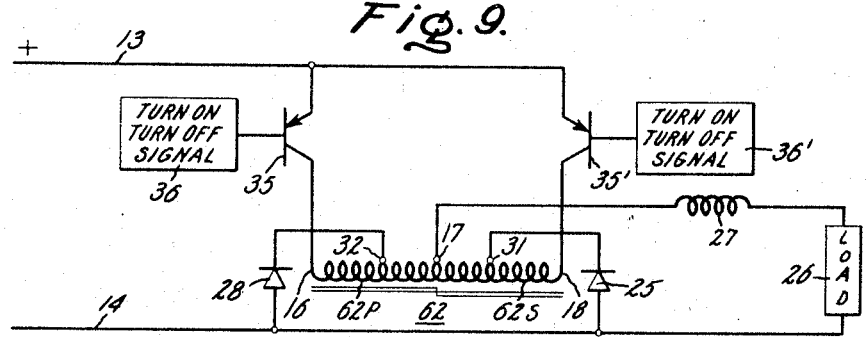

Inventor:
Burnice D. Bedford,
by Donald R. Campbell
Attorney.

Inventor:
Burnice D. Bedford,
by Donald R. Campbell
Attorney.

Inventor:
Burnice D. Bedford,
by Donald R. Campbell
Attorney.

Patented Mar. 18, 1969

3,434,030
TRANSFORMER COUPLED TIME RATIO
CONTROLLED CIRCUITS
Burnice D. Bedford, Scotia, N.Y., assignor to General
Electric Company, a corporation of New York
Original application Sept. 14, 1964, Ser. No. 396,153, now
Patent No. 3,331,008, dated July 11, 1967. Divided and
this application Mar. 14, 1967, Ser. No. 623,081
U.S. Cl. 321—2                                    1 Claim
Int. Cl. H02m 3/32

ABSTRACT OF THE DISCLOSURE

A family of time ratio controlled power circuits employ transformer coupling between the D-C supply and the load to achieve more effective voltage control for a wide number of applications. In some circuits an autotransformer is used, while in others where isolation is desired a two-winding transformer is used. One or more SCR's, power transistors, silicon controlled switches or GTO's are in series with at least a portion of the primary winding of the transformer to chop the D-C supply, the load and a filter inductance are coupled across at least a portion of the secondary winding, and at least two load current carrying rectifiers are provided. In some circuits different modes of operation are possible as by varying the period of conduction of the SCR, etc. or by employing mechanical switches.

---

This application is a division of S.N. 396,153 now Patent No. 3,331,008 filed Sept. 14, 1964, and assigned to the same assignee as the present invention.

The present invention relates to time ratio control power circuits.

More particularly the invention relates to time ratio control power circuits employing transformers in the load current path to achieve more effective voltage control and efficient operation.

Time ratio control of an electric potential is accomplished by chopping up a high value electric potential (usually a direct current potential) by the alternate turning on and off of an electric valve such as the silicon controlled rectifier connected in circuit relationship with a load to a supply voltage source. While there are many known time ratio control power circuits available to the art, many of these known circuits have certain shortcomings which make them unsuitable for use for certain applications. The present invention makes available a whole family of new time ratio control power circuits which possess unique characteristics that makes them desirable for use in a wide number of applications.

It is therefore a primary object of the present invention to provide a family of new and improved time ratio control power circuits employing transformers in the load current path which provide variable voltage control over a wide range of voltages, and which are efficient in operation.

Another object of the invention is to provide time ratio control power circuits having the above characteristics which are relatively simple in design and inexpensive to manufacture.

A further object of the invention is to provide time ratio control power circuits of the above type which are capable of operating in a low voltage-high current mode of operation, and which can later shift to a high voltage-reduced current mode of operation, and therefore are highly suitable for use in traction motor application.

A still further object of the invention is to provide time ratio control power circuits having the above stated characteristics, and which can be designed to isolate the output from the input.

In practicing the invention a new and improved time ratio control power circuit is provided which includes in combination at least one load current carrying conductivity controlled conducting device such as a silicon controlled rectifier or a power transistor. This device connected in series circuit relationship with the primary winding portion of a transformer with the series circuit thus comprised being connected across a pair of power supply terminals that in turn are adapted to be connected across a source of electric potential. Means are provided for turning on the conductivity controlled device to cause it to conduct, and for turning off the conductivity control conducting device after a desired interval of conduction. The primary winding portion of the transformer is inductively coupled to a secondary winding portion, and a load is operatively coupled across at least a part of a secondary winding portion of the transformer. In certain forms of the new and improved time ratio control power circuit, the transformer is an autotransformer. In other embodiments of the invention where it is desired to provide isolation between the input and output of the circuit, the transformer comprises a two winding transformer having physically separated but inductively coupled primary and secondary winding portion.

Other objects, features and many of the attendant advantages of this invention will be appreciated more readily as the same becomes better understood by reference to the following detailed description, when considered in connection with the accompanying drawings wherein like parts in each of the several figures are identified by the same reference character, and wherein:

FIGURE 4 illustrates still another form of TRC circuit similar to that shown in FIGURE 3, and illustrates one manner of achieving a wide range of control over the voltage step-up of the output load voltage;

FIGURE 5 is a schematic circuit diagram of still a different form of TRC circuit employing an autotransformer which is capable of operating either in a low voltage-high current mode or a high voltage-reduced current mode.

FIGURE 6 is a schematic circuit diagram of a TRC circuit constructed in accordance with the invention which employs a saturable core autotransformer;

FIGURE 7 illustrates a version of a TRC circuit constructed in accordance with the invention which employs an autotransformer and two conductivity controlled conducting devices;

FIGURE 8 is a schematic circuit diagram of a variation of the TRC circuit shown in FIGURE 7, and which employs $dv/dt$ fired SCR's as the conductivity controlled conducting devices;

FIGURE 9 is a schematic circuit diagram of a TRC circuit constructed in accordance with the invention which employs two conductivity controlled conducting devices and a saturable core autotransformer;

Figure 1:
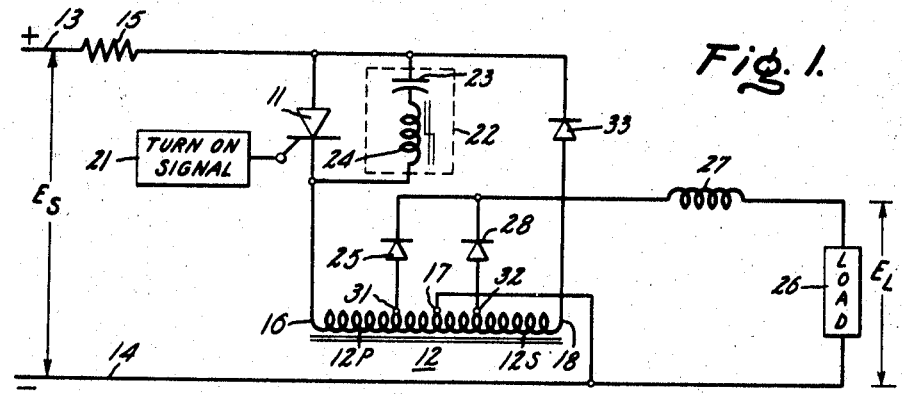
FIGURE 1 is a schematic circuit diagram of a new and improved transformer coupled time ratio control (TRC) power circuit constructed in accordance with the invention and which employs an autotransformer in the load current path.

FIGURE 1 of the drawings illustrates one form of a new and improved time ratio control power circuit employing transformers constructed in accordance with the invention. The time ratio control (hereinafter referred to as a TRC) shown in FIGURE 1 is comprised by a conductivity controlled conducting device 11 that in the circuit embodiment shown in FIGURE 1 constitutes a conventional silicon controlled rectifier of the type described in the Silicon Controlled Rectifier Manual, Third Edition, published by the Rectifier Components Department of the General Electric Company located on West Genesee Street in Auburn, N.Y. The silicon controlled rectifier (hereinafter referred to as a SCR) 11 is connected in series circuit relationship with the primary winding portion 12p of an autotransformer 12, and the series circuit thus comprised is connected across a pair of power supply terminals 13 and 14 that in turn are adapted to be connected across a source $E_s$ of direct current electric potential. If desired a voltage limiting resistor 15 may be inserted in one of the power supply terminals 13, for example. The transformer 12 constitutes an autotransformer formed by a primary winding portion 12p extending between the points 16 and 17 and a secondary winding portion 12s extending between the points 17 and 18 wherein the point 17 comprises the intermediate tap-off point that defines the primary and secondary winding portions. A turn-on signal source 21 which may comprise any one of the gating signal sources described in Chapter 4 of the above-identified SCR Manual, for example, is operatively connected to the control gate of the SCR 11. In order to turn off the SCR 11, turn off means are provided which comprise a commutating circuit 22 formed by a capacitor 23 and saturable reactor 24 connected in series circuit relationship across the SCR 11. The commutating circuit 22 comprises the well known Morgan commutation circuit wherein in one cycle of operation the saturable reactor 24 is twice driven through its major hysteresis loop into a saturation condition to first initially reverse the polarity of the charge across the capacitor 23, and then to apply the reverse polarity charge across the SCR 11 to thereby turn it off. For a more detailed description of the construction and operation of the commutation circuit 22, reference is made to U.S. Patent Number 3,019,355 issued Jan. 30, 1962 entitled "Magnetic Silicon Controlled Rectifier Power Amplifier" by R. E. Morgan, inventor, assigned to the General Electric Company.

First load current rectifying means comprised by a large power rated semiconductor diode 25 is provided for coupling a load 26 and series connected filter inductance 27 across at least a portion of the primary winding portion 12p of the autotransformer 12. Similarly, second rectifying means comprised by a second power rated semiconductor diode 28 is used for coupling at least a portion of the secondary winding 12s of the autotransformer across the series connected load 26 and filter inductance 27. For this purpose, the anode of the diode 25 is connected to a point 31 on the primary winding portion 12p which is between the end terminal 16 and the intermediate tap-off point 17 that defines the primary and secondary winding portions of the autotransformer. Likewise, the diode 28 has its anode connected to a tap-off point 32 on the secondary winding portion 12s which is between the end terminal 18 and intermediate tap-off point 17 with the two cathodes of diodes 25 and 28 being connected in common through the filter inductance 27 to load 26. As the result of connection in this manner, it can be appreciated that in effect the diode 25 and the portion of primary winding 12p extending between the tap-off points 17 and 31 are connected in parallel circuit relationship with the series connected diode 28 and the portion of the secondary winding 12s extending between the tap-off points 17 and 32, across load 26 and filter inductance 27. The circuit is completed by a feedback diode 33 which is connected between the end terminal 18 of secondary winding portion 12s and the power supply terminal 13.

For the purpose of illustration only, it should be assumed that the autotransformer 12 is constructed in such a matter that the number of turns on the primary winding portion 12p is equal to the number of turns on the secondary winding portion 12s. Also the intermediate tap-off points 31 and 32 are located such that the number of turns in the portions 17 to 31 and 17 to 32 are about ⅓ of the total number of turns in the primary and secondary winding portions, respectively. It should also be noted that construction of the circuit can be varied to make these turns ratios have any desired value so as to either increase or decrease the load voltage $E_L$ developed across load 26. The load voltage $E_L$ step-down or step-up (and consequently the current step-up or step-down) is determined by the transformer turns ratio of the number of turns in the portion of the primary winding between tap-off points 17 and 31 to the number of turns in primary winding portion 12p, and the ratio of the number of turns in the portion of the secondary winding extending between tap-off point 17 and 32 to the number of turns in the secondary winding 12s. It should be further noted that the autotransformer 12 is of conventional construction using conventional wire wound techiques, although it is preferred that the core of the autotransformer 12 include an air gap so that the transformer requires some definite magnetizing current for energy storage purposes. In all other respects, the autotransformer 12 is of conventional construction, and its fabrication is considered to be within the abilities of a mechanic skilled in the art.

In operation the SCR 11 is turned on by gating on signals supplied from the gating signal source 21, and is subsequently turned off by the commutation circuit means 22 at some predetermined time interval after the SCR has been turned on. By varying the rate at which the SCR 11 is turned on and off, the amount of current supplied through SCR 11 can be varied proportionately in accordance with the well-known time ratio control technique. By this technique it is possible to chop the direct current electric potential supplied from the power source $E_S$ by turning the SCR 11 on and off at a variable rate so that the ratio of on-time to off-time is varied to hereby proportionately control the value of the load voltage $E_L$ supplied to load 26. The filter inductance will tend to filter out the pulses in the load current supplied to load 26 so that the resultant output load voltage $E_L$ will be smoothly and proportionally varied at the rate at which the SCR 11 is turned on and off. Accordingly, it can be appreciated that a time ratio control power circuit accomplishes control of the load voltage supplied to a load by chopping up a direct current electric supply potential, and subsequently smoothing it by suitable filtering to provide a desired output potential that is a proportional part of the input potential, the proportional part being determined by the manner in which the SCR 11 is turned on and off. With the circuit arrangement shown in FIGURE 1, the SCR 11 will be commutated off a fixed interval of time after it has been gated on due to the nature of the commutation circuit 22. With a fixed on-time, time ratio control of the power delivered to the load can be obtained by varying the frequency of operation of the circuit. With fixed on-time, if the frequency of operation is increased, the output power delivered to the load is proportionally increased. Conversely, with fixed on-time if the frequency of operation of the circuit is decreased, the output power delivered to the load is proportionally decreased. For more detailed description of the technique of time ratio control of direct current electric power, reference is made to an article entitled "Time Ratio Control With Combined SCR and SR Commutation" appearing in I.E.E.E. Transaction Paper No. 63–1448, published Oct. 27, 1963.

With respect to the particular time ratio control power circuit shown in FIGURE 1, its operation is as follows. Upon the load current carrying SCR 11 being gated on by the turn-on signal source 21, current will flow through the primary winding portion 12p of autotransformer 12. The potential appearing across the portion of the primary winding 12p between tap-off points 31 and 17 will be supplied through the first rectifying means 25 across load 26 and filter inductance 27 during the interval of conduction of SCR 11. Upon SCR 11 being turned off by its commutation circuit means 22, the magnetic lines of flux built up around the turns of the secondary winding portion 12s due to inductive coupling between the secondary windings 12s and the primary winding 12p, will collapse and will produce a potential across the secondary winding half 12s which is positive at the end terminal 18. The portion of this potential which appears across the turns of winding 12s extending between tap-off point 17 and 32 is supplied through the second rectifying means 28 across load 26 and series connected filter inductance 27. The value of the load potential will be determined primarily by the number of turns in the portions of the primary winding 12p extending between points 17 and 31 and the number of turns and the windings extending between tap-off points 17 and 32 as well as the rates of turn-on and turn-off of load current carrying SCR 11 in accordance with the well established time ratio control technique discussed above.

With the particular arrangement shown in FIGURE 1 where the turns from 17 to 18 equal the turns from 16 to 17, maximum voltage can be developed across the load 26 when the SCR 11 is turned on an equal amount of time to the time that it is turned off. During the time that the SCR 11 is turned off, the feedback diode 33 limits the value of the potential that can be developed across the secondary winding half 12s to the value of the supply voltage $E_S$ since if the potential across 12s tends to exceed the supply voltage, diode 33 will conduct and clamp the potential of the point 18 to the value of the supply voltage. It can be appreciated therefore that the circuit of FIGURE 1 provides a variable output load voltage $E_L$ which extends from substantially zero output voltage to a value equal to the value of the supply voltage $E_S$. This control is achieved once the circuit has been adjusted with respect to tap-off points 31, 17 and 32, by varying the turn-on and the turn-off of load current carrying SCR 11 in accordance with the well known time ratio control technique. With respect to the size of the components used in the circuit shown in FIGURE 1, for certain types of loads where the load voltage values will be relatively high with respect to the supply voltage, the inductance 27 can be only a small coasting reactor since principal filtering of the current pulses supplied through SCR 11 can be achieved in the autotransformer 12. However, for loads which require an appreciable reduction in the value of the supply voltage, the inductance 27 will be required to circulate considerable energy to the load, and hence will have to be substantially larger than that required for the first mentioned type of load. The particular load current carrying SCR 11 should be selected to withstand a reverse potential of twice the supply voltage $E_S$ with the circuit arrangement of FIGURE 1. If it is desired to use a smaller rated SCR 11, this can be done by making secondary winding portion 12s of the autotransformer 12 larger with respect to the primary winding portion 12p. Design of the circuit in this manner would effectively step down the value of the reverse voltage applied across the load current carrying SCR 11 during its nonconducting intervals by primary winding portion 12p of the autotransformer during reset of the core of transformer 12 which occurs during the nonconducting intervals of SCR 11.

Figure 2:
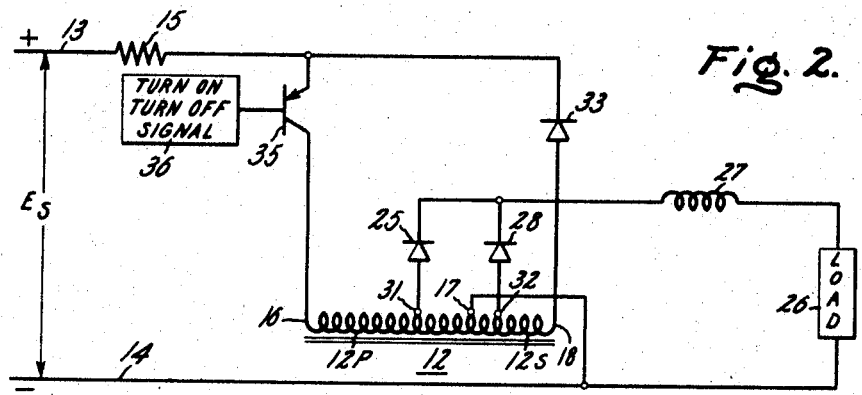
FIGURE 2 is a schematic circuit diagram of a variation of the TRC circuit shown in FIGURE 1 wherein a different type of conductivity controlled conducting device is employed, and which illustrates one method of achieving a wide range of voltage control with the circuit, and wherein the transformer turns ratio is arranged for fast reset.

FIGURE 2 of the drawings illustrates a modification of the circuit arrangement shown in FIGURE 1 wherein a power transistor 35 and an associated turn-on, turn-off signal source 36 is substituted in place of the load current carrying SCR 11 and its associated turn-on signal source 21 and commutating circuit 22. The power transistor 35 may comprise any germanium power transistor (such as the General Electric 2N1907) but may also comprise a silicon power transistor, and may be either a PNP or a NPN junction transistor. The turn-on-turn-off signal source 36 may comprise any conventional square wave signal generator such as are described for example in Chapter 4 of the above identified Silicon Rectifier Manual, 3rd Edition, published by the General Electric Company. Depending of course upon whether a PNP or NPN junction transistor 35 is employed, either the positive half cycle or negative half cycle of the square wave signal from signal source 36 is effective to turn-on the power transistor 35 and the succeeding half cycle will turn it off. The time duration of the positive going portion of the square wave turn-on-turn-off signal relative to the negative going portion of the square wave signal will of course determine the magnitude of the turn-on time with respect to the turn-off time of the power transistor 35 so as to thereby provide time ratio control over the output power developed by the circuit.

In addition to the above differences, it should be noted that the tap-off points 31 and 32 for the first and second rectifying diodes 25 and 28 respectively, as well as the intermediate tap-off point 17 are different from those shown in the circuit arrangement of FIGURE 1. By varying the tap-off points 17, 31 and 32 in this manner with respect to the end terminal points 16 and 18 of the autotransformer, it is possible to change the characteristics of the time ratio control power circuit so as to adapt it to particular load requirements. With the particular setting shown in FIGURE 2, it is assumed that the intermediate tap-off point 17 is arranged such that the primary winding portion 12p between points 16 and 17 has twice the number of turns of the windings between end terminal 18 and intermediate tap-off point 17. Similarly, the number of turns in the winding portion between points 17 and 31 is twice the number of turns of the winding portion between tap-off points 17 and 32. As a result of this arrangement, a much faster reset time for the core of the autotransformer can be obtained so as to allow a greater on-time for the power transistor 35. This greater on-time will in turn allow a greater output current so as to increase the output current so as to increase the output power of the circuit. This greater output power can be achieved with a power transistor 35 of a given current rating, but due to the relatively larger number of turns in the winding portion between end terminal 16 and intermediate tap-off point 17, it requires that the power transistor 35 have a greater voltage rating. Hence, it can be appreciated that when the tap-off points of the autotransformer 12 are adjusted in the manner illustrated in the circuit arrangement of FIGURE 2 to provide a different operating characteristic for the circuit, it is necessary that the other components such as the power transistor 35 be revaluated to determine that their characteristics will be appropriae for the new operating conditions. In all other respects, the circuit arrangement of FIGURE 2 will operate in an identical fashion to the circuit arrangement of FIGURE 1.

Figure 3:
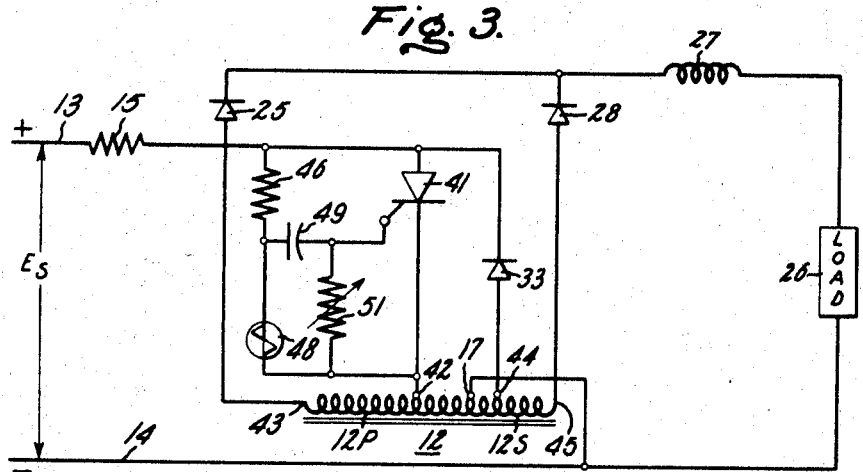
FIGURE 3 is a schematic circuit diagram of a TRC circuit constructed in accordance with the invention which provides a voltage step-up of the supply voltage and thereby obtain output load voltages higher than the supply voltage.

FIGURE 3 of the drawings illustrates an embodiment of the invention which is in many respects similar to the circuits shown in FIGURES 1 and 2 with the exception that the circuit in FIGURE 3 is designed to provide a greater output load voltage $E_L$ than the supply voltage $E_S$. In the embodiment invention shown in FIGURE 3, a load current carrying gate turn-off silicon controlled rectifier device 41 is connected in series circuit relationship with the portion of the primary winding 12p of autotransformer 12 extending between the intermediate tap-off point 17 and a tap-off point 42 which is located between intermediate tap-off point 17 and end terminal 43 of primary winding 12p. The series circuit thus comprised is connected between the two power supply terminals 13 and 14. The first load current rectifying means 25 is connected between the end terminal 43 and filter inductance 27 so as to in effect couple the entire primary winding portion 12p extending between intermediate tap-off point 17 and end terminal 43 across the series connected load 26 and filter inductance 27. Similarly, the feedback rectifying diode 33 is connected to an intermediate tap-off point 44 on the secondary winding portion 12s of autotransformer 12 which is between the intermediate tap-off point 17 and the end terminal 45. The second load current rectifying diode 28 is connected between the end terminal 45 of the secondary winding portion 12s and filter inductance 27 so as to in effect couple the entire secondary winding portion 12s of the autotransformer which extends between the tap-off point 17 and end terminal point 45 across the series connected load 26 and filter inductance 27.

The gate turn-off silicon controlled rectifier device 41 is of the type manufactured and sold by the Rectifier Components Department of the General Electric Company located in Auburn, New York, and is described in the above-referenced Silicon Control Rectifier Manual in Chapter 12. The gate turn-off SCR which hereinafter will be referred to as a GTO is turned on and off by a suitable resistance-capacitance firing network which is connected to its gate electrode. This R-C network is comprised by a series connected voltage limiting resistor 46 and a snap action switch device 48 connected in series circuit relationship across the GTO 41. The snap action switch device 48 is a PNPN voltage fired device such as a Hunt diode, a Shockly diode, or a signal current "Disc" manufactured and sold by the Rectifier Components Department of the General Electric Company. Each of these devices is of the nature such that upon the voltage across the device reaching a predetermined level, the device breaks down and conducts, and in the conducting condition presents essentially zero impedance to the flow of electric current. However, upon the current through such snap action device falling below a predetermined holding level, the device returns to its blocking state, and represents a substantially infinite impedance to the flow of electric current therethrough. The juncture of the snap action device 48 and voltage limiting resistor 46 is connected through a charging capacitor 49 to the gate electrode of GTO 41, and a variable resistor 51 is connected in parallel circuit relationship with the series connected snap action switch device 48 and capacitor 49. The R-C time constant of the series connected capacitor 49 and variable resistor 51 is adjusted to provide a desired charging rate on the capacitor 49 so as to control the turn-off time of the GTO 41. At some predetermined time after the GTO 41 has been turned on, the snap action switch device 48 will be rendered conductive by the continual buildup in the voltage on capacitor 49 so as to in effect reverse the voltage between the gate and the emitter electrodes of the GTO 41 thereby causing it to turn off. This results in discharging capacitor 49 so that it allows GTO 41 to turn off, and again begins to charge through resistor 51 to a value sufficient to turn off the GTO 41 thereby completing a cycle of operation. By varying the value of the charging resistor 51 it can be appreciated that the turn-on and the turn-off of GTO 41 can be varied to thereby proportionally vary the output load current supplied to load 26.

In operation, upon turn-on of the GTO 41 load current will flow through the turns of the primary winding portion 12p of autotransformer 12 extending between points 42 and 17. This load current flow will induce a voltage in the winding portion 12p extending between points 43 and 17 which is substantially twice the supply voltage in accordance with the well-known expression:

$$E_{sec} = N_S E_P / N_P \quad (1)$$

where $E_{sec}$ is the voltage from 43 to 17, $N_S$ is the number of turns from 43 to 17, $E_P$ is the voltage from 17 to 42 and $N_P$ is the number of turns from 17 to 42. Assuming that the number of turns between points 43 and 17 is double the number of turns between 42 and 17, then the voltage across the winding portion 42 to 17 will be equal to the supply voltage $E_S$, and the voltage induced in the winding portion 43 to 17 will be equal to $2E_S$. This voltage will be applied through the first rectifying diode 25 across series connected load 26 and filter inductance 27. Similarly, during the reset portion of one cycle of operation while the GTO 41 is in its turned-off or non-conducting condition, the feedback rectifying means 33 will limit the potential across the turns of the secondary winding portion 12s extending between points 17 and 44 to the value of the supply voltage $E_S$, and, assuming that the turns from 17 to 45 are double the turns from 17 to 44, then the voltage supplied through the second load current rectifying diode 28 across load 26 and filter inductance 27 will be equal to twice the supply voltage $E_S$. Thereafter by controlling the ratio of on-time to off-time of the GTO 41 in accordance with TRC principles, the load voltage $E_L$ appearing across load 26 can be made to vary from less than the supply voltage $E_S$ to a value of twice $E_S$.

FIGURE 4 of the drawings illustrates a modification of the circuit arrangement shown in FIGURE 3 wherein the location of the conductivity controlled conducting device 53 and feedback rectifying diode 33 are reversed with respect to the intermediate tap-off point 17 on autotransformer 12 in relation to power supply terminals 13 and 14. In addition, the conductivity controlled conducting device 53 comprises a silicon controlled switch device having a first exposed gating electrode connected directly to a source of turn-on signals 21, and having a second turn-off gate electrode connected directly to a source of turn-off signals 54. The silicon controlled switch device 53 is described more fully in Chapter 19 of the Transistor Manual, Sixth Edition, published by the Semiconductor Products Department of the General Electric Company located at Electronics Park, Syracuse, N.Y. Insofar as the turn-on signal source 21 and the turn-off signal source 54 are concerned these may comprise conventional gating signal sources of the type described in Chapter 4 of the above-identified Silicon Control Rectifier Manual. It should be further noted that the tap-off points 42, 17 and 44 on autotransformer 12 have been adjusted with respect to the circuit arrangement shown in FIGURE 3 so that it is possible to vary the output load voltage $E_L$ across load 26 from a value greater than twice the supply voltage $2E_s$ down to a value equal to the supply voltage $E_s$ by proportionately controlling the on and off times of the silicon controlled switch 53. In addition, it should be noted that the output voltage includes the supply voltage so that the power handled by the silicon controlled switch and transformer is reduced. The circuit is especially useful for applications where it is desired to obtain only a small boost in supply voltage. In all other respects it is like the circuit shown in FIGURE 3.

FIGURE 5 of the drawings illustrates an embodiment of the invention which is in many respects similar to the circuit arrangement shown in FIGURE 1, but operates in an entirely different manner. The primary distinction in the circuit in FIGURE 5 over that of FIGURE 1 lies in the manner of connection of the first and second load current rectifying diodes 25 and 28 between power supply terminal 14 and the tap-off points 31 and 32 respectively on the autotransformer 12. In order to connect the first and second load current rectifying diodes 25 and 28 in this manner, the intermediate tap-off point 17 is connected through filter inductance 27 and load 26 to the power supply terminal 14. There is another distinction in the circuit arrangement of FIGURE 5, and that is in the design of the autotransformer 12. In the circuit arrangement of FIGURE 5, the autotransformer 12 should be designed to employ a magnetic core having an air gap similar to the circuit of FIGURE 1 so that the stored energy in the autotransformer can supply power to the load 26 while the magnetic lines of flux are collapsing during the reset or non-conducting intervals of the SCR 11.

In operation, the circuit of FIGURE 5 is capable of operating in two different modes, and because of this capability is ideally suited for use in traction motor applications wherein it is desired first to supply low voltage-high current starting power to the load during initial start-up, and thereafter to provide high voltage-reduced current for running the load after it has been initially started. With the circuit arrangement in FIGURE 5, it is possible to do this by appropriately adjusting the frequency of operation of the SCR 11 and/or appropriately extending the conducting interval of SCR 11 relative to its off period.

To operate the circuit of FIGURE 5 in the low voltage-high current mode of operation, the period of conduction of the SCR 11 is adjusted so that the core of the linear autotransformer 12 is operated over the linear portion of its hysterisis curve. This can be accomplished either by shortening the intervals of conduction of SCR 11 relative to the off intervals, or decreasing the frequency of operation of the circuit (assuming a fixed on period for SCR 11). While operating the circuit in this manner, the circuit will operate in substantially the same manner as was described in connection with the circuits shown in FIGURES 1–4 of the drawings to provide normal transformer step-up of the load current supplied to load 26. There is a distinction, however, in that during the intervals of conduction of the load current carrying SCR 11, the first load current rectifying device 25 is rendered conductive to couple the voltage appearing across the winding turns between points 17 and 31 across the series connected load and filter inductance 27. During the reset interval of operation while the load current carrying SCR 11 is non-conducting, the second load current rectifying diode 28 is rendered conductive to couple the voltage appearing across the winding turns between points 17 and 32 of autotransformer 12 across the series connected load 26 and filter inductance 27. During this reset period, the feedback diode 33 limits the value of the voltage appearing across the transformer winding turns between point 32 and end terminal 18 to the value of the supply voltage $E_s$. The value of the load current step-up will be in accordance with the well known expression:

$$I_s = N_p I_p / N_s \qquad (2)$$

where in connection with the circuit of FIGURE 5, $I_s$ is the current flowing in the winding turns between points 17 and 31 during conducting intervals of SCR 11 (and hence is equal to the load current); $N_s$ is the number of turns between points 17 and 31; $I_p$ is the current flowing in the winding turns between end terminal 16 and point 31; and $N_p$ is the number of turns between end terminal 16 and point 31. During the reset or off interval of SCR 11, $I_s$ (which is equal to the load current) is the current flowing in the winding turns 17 to 32; $N_s$ is the number of turns between points 17 and 32; $I_p$ is the current flowing between end terminal 18 and point 32, and $N_p$ is the number of turns between end terminal 18 and tap-off point 32.

In order to operate the circuit of FIGURE 5 in the high voltage-reduced current mode of operation, the period of conduction of SCR 11 is increased sufficiently relative to its off periods so that the core of autotransformer 12 is driven closer to a saturation condition although it is still operated over the linear portion of its hysteresis curve. This can be accomplished either by extending the intervals of conduction of SCR 11 relative to the off intervals, or increasing the frequency of operation of the circuit sufficiently (assuming a fixed on period for SCR 11) to drive the core of autotransformer 12 in the above described manner. With the core of autotransformer 12 operated in this manner, the primary winding portion $12p$ extending between end terminal 16 and intermediate tap-off point 17 presents substantially less impedance so that in effect the circuit is capable of supplying load current to load 26 at slightly less than the voltage $E_s$ of the power supply connected across power supply terminals 13 and 14, while at the same time continuing to supply a current step-up of the load current. Hence, it can be appreciated that the reduced voltage-large current starting power can be used to start the load 26, which might be a traction motor under load, for example. Thereafter, once the traction motor has been started, the circuit can be shifted to a higher voltage-reduced current mode of operation by merely changing the frequency at which it is operating, or alternatively, changing the relative on-off intervals of SCR 11. It should also be noted that the circuit configuration of FIGURE 5 can be adjusted by varying the tap-off points of autotransformer in a manner similar to that discussed in connection with FIGURES 2 and 3 of the drawings to initially align the circuit for use within a pre-designed range of output load voltages. Time-ratio control in the above described manner can then be used to provide any desired output voltage within this predesigned range.

In addition to the above distinctions, it should be noted that the commutation circuit means 22 associated with load current carrying SCR 11 in the circuit arrangement of FIGURE 5 is somewhat different from the commutation circuit means 22 employed in the circuit arrangement of FIGURE 1. The commutation circuit means 22 shown in the FIGURE 5 circuit arrangement is comprised by an auxiliary SCR 55 connected in series circuit relationship with a linear inductance 56 and a capacitor 57 across the load current carrying SCR 11. A feedback diode 58 is connected in parallel circuit relationship with the auxiliary SCR 55 in a reverse polarity sense for circulating energy trapped in the linear inductance 56 during the commutation interval. The commutation circuit thus comprised constitutes the well-known McMurray commutation circuit wherein energy stored in the capacitor 57 during the non-conducting intervals of SCR 11 by charging through feedback diode 58 is initially trapped upon turn-on of the load current carrying SCR 11. At the time when it is desired to commutate off the load current carrying SCR 11, the auxiliary commutating SCR 55 is turned on. Upon turn on of auxiliary commutating SCR 55, the energy stored in capacitor 57 is circulated in a reverse current direction through the load current carrying SCR 11 and series tuned inductor 56 so as to cause the load current carrying SCR 11 to turn off. This also results in reversing the polarity of the charge on capacitor 57 so that the auxiliary SCR 55 turns off simultaneously with the turn off of load current carrying SCR 11. For a more detailed description of this type of commutating scheme, reference is made to A.I.E.E. paper No. 61-718 entitled "A Silicon Controlled Rectifier Inverted With Improved Commutation" by W. McMurray and D. P. Shattuck presented at A.I.E.E. Summer General Meeting in Ithaca, N.Y.—June 1961. It should be noted, however, that the particular commutation circuit 22 employed does not affect the operation of the novel transformer coupled time ratio control circuit illustrated in FIGURE 5, but it does serve to illustrate the wide variety of techniques that are available for turning on and turning off the conductivity controlled conducting device 11 employed in the power circuit.

FIGURE 6 of the drawings illustrates an embodiment of the invention which is in many respects similar to the circuit arrangement of FIGURE 5 in that it is capable of two modes of operation, but differs therefrom structurally in a number of ways. In the circuit arrangement of FIGURE 6, a power transistor 35 is employed as the load current carrying conductivity controlled conducting device, and a saturable core autotransformer 62 is employed in place of the linear core transformer 12 of the arrangement shown in FIGURE 5. Additionally, the second load current rectifying diode 28 is connected directly to the intermediate tap-off point 17 to which the load 26 and filter inductance 27 are connected so that diode 28 operates as a coasting rectifier. Also the feedback rectifier 33 has a resetting resistor 63 connected in parallel circuit relationship with it, the parallel circuit thus formed being connected between the power supply terminal 13 and the end terminal 18 of saturable core autotransformer 62.

In operation, it can be appreciated that by extending the period of conduction of the power transistor 35, relative to its off interval, or increasing the frequency of operation of the circuit (assuming a fixed on time), the core of the autotransformer 62 can be driven into saturation so that in effect the load 26 and series connected filter inductance 27 are supplied directly from the high voltage source. With the circuit operated in this manner, the second rectifying diode 28 functions as a coasting rectifier to circulate the energy trapped in the filter inductance 27 during the intervals of non-conduction of the power transistor 35. It follows, therefore, that with the circuit arrangement of FIGURE 6, filter inductance 27 will have to be a substantial reactor so as to store sufficient energy to supply the load 26 during the intervals of non-conducting intervals of power transistor 35. During operation of the circuit in this mode, the core of the autotransformer 62 is reset during the non-conducting intervals of power transistor 35 by current flowing through the resetting resistor 63.

When it is desired to operate the circuit of FIGURE 6 in its low voltage-high current mode, the frequency of operation of the circuit, or the period of conduction of the load current carrying power transistor 35 is reduced sufficiently to avoid driving the core of saturable core transformer 62 into saturation. With the circuit operating in this manner, the first rectifying diode 25 will function to supply the stepped up load current flowing in the winding turns between points 17 and 31 to the series connected load 26 and filter inductance 27, during the intervals of conduction of the load current carrying power transistor 35. During the non-conducting intervals of power transistor 35, the voltage appearing across the secondary winding portion 62s of the autotransformer is limited by feedback diode 33, and the energy trapped in the filter inductance 27 is circulated by second load current rectifying diode 28 which functions as a coasting rectifier.

FIGURE 7 of the drawings illustrates an embodiment of the invention which is substantially identical to the circuit arrangement shown in FIGURE 1 of the drawings with the exception that a second load current carrying power transistor 35' together with its associated turn-on turn-off signal source 36' is substituted in place of the feedback rectifying means 33 employed in the circuit arrangement of FIGURE 1. By this modification, the circuit arrangement of FIGURE 7 can be made to operate in a push-pull fashion wherein each of the power transistors 35 and 35' are operated sequentially so that one of of the power transistors resets the flux in the core of the autotransformer 12 for the other power transistor. If it is assumed that the transformer turns of the primary winding portion 12p are equal to the turns of the secondary winding portions 12s, then maximum output voltage can be obtained with the circuit arrangement of FIGURE 7 when each power transistor 35 and 35' is on for one-half of the time. It should be noted, however, that the particular tap-off arrangement illustrated in FIGURE 7 is not required and the tap-off points could be arranged as indicated in the circuit arrangement of FIGURE 2 to provide faster reset time for one of the power transistors 35, or alternatively could be arranged to provide a step-up of the output load voltage with respect to the supply voltage in the manner depicted in the circuit arrangement of FIGURE 3. Since such modifications are deemed obvious in the light of the previous disclosure, further elaboration of these variations is not deemed necessary.

The circuit arrangement shown in FIGURE 8 of the drawings operates in a manner similar to the FIGURE 5 circuit to provide two different modes of operation wherein a large starting current can be obtained for the load 26 and subsequently the circuit can be shifted to operate in a higher voltage mode. The circuit in FIGURE 8 differs from the FIGURE 5 circuit, however, in that it employs two current carrying $dv/dt$ fired silicon control rectifier devices 71 and 71' in place of the conventional SCR 11 and feedback diode 33, respectively. Each of the $dv/dt$ fired SCR's 71 and 71' have associated turn-on circuitry therewith indicated generally by the reference numerals 72 and 72', respectively, as well as the conventional commutation circuits 22 and 22' for turning off the $dv/dt$ fired SCR's after they have been gated-on. By sequential turning on and off of the two $dv/dt$ fired SCR's 71 and 71' in a push-pull fashion at a high enough frequency, or by extending the period of conduction of one of the two $dv/dt$ fired SCR's 71 or 71' sufficiently, relative to the other, or by simultaneous conduction of the two devices, the core of auto-transformer 12 can be driven close to saturation but still operated over the linear portion of its hysteresis curve to provide a high voltage-reduced current mode of operation in the manner previously described more fully in connection with the FIGURE 5 circuit. Alternatively by shortening the period of conduction of the two $dv/dt$ fired SCR 71 or 71' relative to each other and operating them sequentially in a push-pull fashion at a low enough frequency so that one resets the core of autotransformer 12 for the other, normal transformer action can be obtained from the autotransformer to provide a current step-up of the load current at low voltage in a similar fashion to that described in relation to the FIGURE 5 circuit.

With regard to the $dv/dt$ fired SCR's 71 and 71', it should be noted that these devices are conventional silicon controlled rectifier devices which have their gates open-circuited, and which are fired by applying a steep wavefront voltage pulse across the load terminals of the devices. For this purpose, the devices require a special starting circuit, and since the starting circuitry associated with the $dv/dt$ fired SCR device 71' is identical and operates in a similar fashion to the starting circuit associated with $dv/dt$ fired SCR 71, it is believed necessary to describe the starting circuit of one of the devices only. The starting circuit 72 is comprised in part by a first charging capacitor 73, a snap action switch device 74, and a second charging capacitor 75 connected in series circuit relationship across the load terminals of the open gated SCR 71. A first voltage limiting resistor 76 is connected between the juncture of snap action switch device 74 with capacitor 75 and the collector load terminal of SCR 71 to provide a charging path for the capacitor 75. A second voltage limiting resistor 77 is connected between the emitter load terminal of SCR 71 and the juncture of snap action switch 74 with charging capacitor 73 to provide a charging path for the capacitor 73. To control operation of the circuit, an NPN junction transistor 78 is connected in series circuit relationship with a limiting resistor 79 across the charging capacitor 73, and a conventional turn-on signal source 21 is connected to the base electrode of the NPN junction transistor 78. By this arrangement, conduction through the transistor 78 controls the rate of buildup of charge on the charging capacitor 73. Upon the charge on capacitor 73 reaching a pre-determined voltage level, the snap action switch device 74 will be rendered conductive and will in effect connect the two charging capacitors 73 and 75 in series circuit relationship across the load terminals of SCR 71. A small saturable reactor 81 is connected in series circuit relationship with the load terminals of the SCR 71 so that the sharp voltage rise applied across the load terminals of this device due to the turn-on of snap action switch device 74, will be held off sufficiently long to cause the SCR device 71 to be rendered conductive in accordance with the well known $dv/dt$ firing technique. The device 71 is then turned off in the normal manner by the commutation circuit means 22 also connected across its load terminals as was described more fully in connection with the circuit arrangement of FIGURE 1. From this description it can be appreciated that the $dv/dt$ fired SCR devices 71 and 71' in fact constitute conductivity controlled conducting devices similar to the previously described conventional SCR 11, power transistor 35, GTO 41, and SCR's 53. Because of the fact that the $dv/dt$ fired devices are rendered fully conductive across their entire cross section almost instantaneously upon being turned on, it is possible to operate the circuit configuration of FIGURE 8 at higher frequencies than would be possible with conventional gate fired SCR's. In all other respects, the circuit of FIG. 8 would operate in a similar fashion to the FIG. 5 circuit, as mentioned earlier.

FIGURE 9 of the drawings illustrates a circuit configuration which is similar to the circuit of FIGURE 6 of the drawings in that it employs a saturating core autotransformer; however, the two circuits differ in that the circuit of FIGURE 9 uses a second conductivity controlled conducting device comprised by power transistor 35' together with its associated turn-on turn-off signal source 36' in place of the feedback diode 33 and parallel connected resetting resistor 63 employed in the FIG. 6 circuit. Another distinguishing feature of the FIG. 9 circuit is that the second load current rectifying diode 28 is connected to a tap-off point 32 on the primary winding portion of saturable core autotransformer 62 which is between the primary end terminal 16 and the intermediate tap-off point 17 to which the load 26 and filter inductance 27 are connected. In operation, the conducting periods of the two load current carrying power transistors 35 and 35' can be appropriately varied in a push-pull fashion by their turn-on turn-off signals sources 36 or 36', respectively, in the manner previously described in detail with relation to FIGURE 7. When operated in this manner, the core of autotransformer 62 is not driven into saturation so that it provides normal transformer action to achieve a current step-up of the load current being supplied to load 26 at either a low voltage or a higher voltage slightly under the supply voltage value as was described more fully in connection with FIG. 5. It is also possible to operate the circuit of FIG. 9 in such a manner that the core of saturable core autotransformer 62 is driven into saturation in which event a still higher voltage-reduced current mode of operation is achieved. This can be accomplished either by extending the period of conduction of one valve relative to the other, providing overlapping periods of conduction, or operating the circuit at a higher frequency (assuming a fixed on time for at least one of the transistors) in the manner described previously in connection with FIG. 6 of the drawings.

From the description of FIGURES 7, 8 and 9, it can be appreciated that time ratio control of the power supplied to load 26 can be achieved by frequency control of the turn-on turn-off power transistors 35 and 35', for example, so that at lower frequencies the autotransformers 12 or 62 are not allowed to saturate and normal transformer action is obtained, and at higher frequencies saturation occurs to provide higher load voltage values. Alternatively, time ratio control can be achieved by varying the ratio of the on time to the off time of the two values. By either technique time ratio control of the load voltage developed across load 26 is provided.

Figure 10:
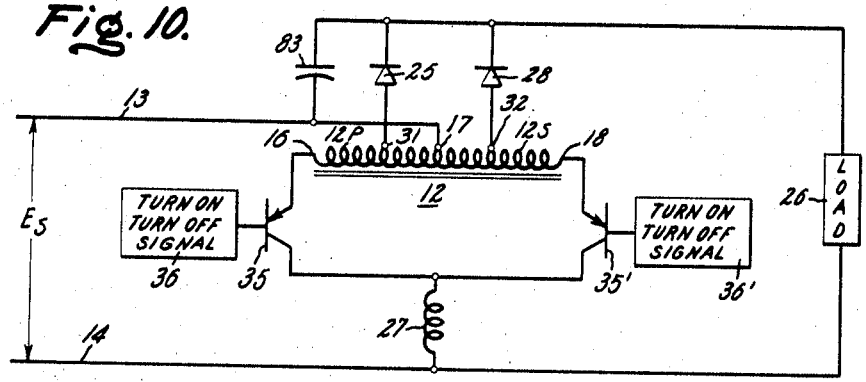
FIGURE 10 illustrates still a different form of TRC power circuit constructed in accordance with the invention employing two power transistors.

FIGURE 10 of the drawings illustrates an embodiment of the invention which is for boosting the value of the load voltage supplied to load 26. For this purpose the filter inductance 27 is connected intermediate the common connected collector electrodes of the two power transistors 35 and 35' and the power supply terminal 14. By this arrangement, the load 26 will be supplied either by a first series circuit comprised by the filter inductance 27, the power transistor 35 when it is conducting, the winding turns between the points 16 and 31 of primary winding 12 of autotransformer 12, and first diode rectifier 25, or alternatively, load 26 is supplied from the series circuit comprised by the filter inductance 27, the power transistor 35' when it is conducting, the winding turns between end terminal 18 and tap off point 32 of autotransformer 12 and a second diode rectifier 28. If the two valves 35 and 35' overlap in their conduction periods, then during such overlap the circuit merely operates as a chopper. To smooth the output voltage appearing across the load 26, a filter capacitor 83 is connected between power supply terminals 13 and one load terminal of load 26.

In operation, the circuit in FIGURE 10 operates as follows. If it is desired to operate the circuit in a high current, low voltage mode, the two power transistors 35 and 35' are operated sequentially in a push-pull fashion so that the circuit operates over the linear portion of the core of autotransformer 12. With the circuit operated in this manner the portion of the autotransformer 12 extending between tap-off point 31 and end terminal 16 will operate as a current step-up to supply load current to the load 26. The voltage appearing across the portion of the winding 16 to 31 will be added in series with the voltage appearing across the filter inductance 27 so that increased voltage is also provided across the load 26 by operating the circuit in this manner. During the succeeding half cycle with the power transistor 35′ turned on similar current step-up is achieved by the winding portion of autotransformer 12 extending between tap point 32 and end terminal 18, and supplied through second diode rectifying means 28 across load 26. Again, the voltages appearing across filter inductance 27 and winding portion 32 to 18 are added in series and supplied across the load. Additional smoothing of the current supplied to the load 26 is achieved with the filter capacitor 83. Where it is desired to operate the load 26 at high voltage and high current levels, either the frequency of turn-on and turn-off of the power transistors 35 and 35′ is increased, or their periods of conductance are arranged so that overlapping conducting intervals occur. During the overlapping conducting interval heavy current flows through each winding half 12p and 12s of the autotransformer 12 into the filter inductance 27. Thereafter upon one of the valves 35 or 35′ being turned off, this heavy current transfers to one of the winding halves to provide substantial current at high voltage.

Figure 11:
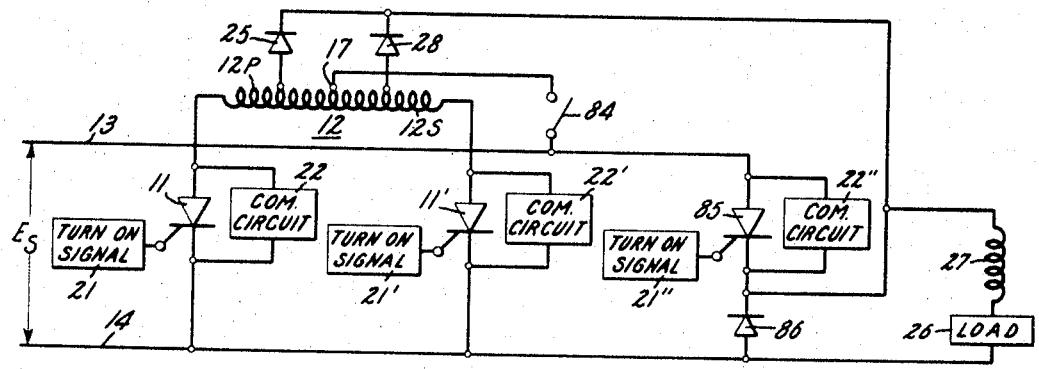
FIGURE 11 is a schematic circuit diagram of an embodiment of the invention which utilizes three SCR's, an autotransformer and mechanical switches to achieve both low voltage-high current and high voltage-reduced current operating modes.

FIGURE 11 of the drawings illustrates an embodiment of the invention wherein a mechanical switch 84 and auxiliary SCR 85 are employed to shift from a high voltage-high current mode of operation to a low voltage-high current mode. The circuit arrangement of FIGURE 11 is in many respects similar to the circuit in FIGURE 7 with the exception that it has been modified to include an on-off switch 84 in the lead to the intermediate tap-off point 17 on autotransformer 12. In addition, the power supply terminal 13 is connected directly through a third auxiliary silicon controlled rectifier device 85 across the series connected load 26 and filter inductance 27 with a coasting rectifier 86 being connected in parallel circuit relationship with the filter inductance 27 and load 26. With the circuit arrangement of FIGURE 11, it is possible by closing switch 84 to utilize the autotransformer 12 to achieve a load current step-up in the manner first described with relation to the circuit shown in FIGURE 7 of the drawings. By gating on SCR's 11 and 11′ sequentially in a push-pull fashion a large current at relatively low voltage to the load 26 for starting purposes in case the load 26 is a traction motor or the like. While operating in this manner, the periods of conductance of the load current carrying SCR's 11 and 11′ can be varied all the way up to provide overlapping conducting periods and thereby achieve high voltage-high current operation of the circuit in the manner previously described with relation to FIG. 10. Thereafter if it is desired to shift to a lower voltage mode of operation, switch 84 is opened and the third SCR 85 turned on and off by turn-on signal source 21″ connected to its gate electrode and commutation circuit means 22″. When operated in this manner the supply voltage source $E_s$ is coupled directly across the load and filter inductance 27 through third SCR 85. The third SCR 85 may then be switched on and off at a rate desired to provide time ratio control of the proportionately controlled output voltage across load 26 in accordance with TRC principles. While operating in this mode, the coasting rectifier 86 will serve to circulate energy stored in the filter inductance 27 through load 26 during the periods of non-conduction of the third SCR 85.

Figure 12:
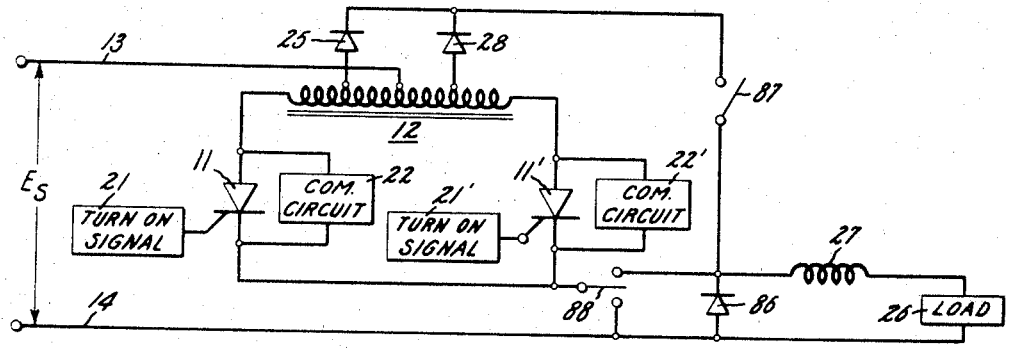
FIGURE 12 is a schematic circuit diagram of a simplified version of the circuit shown in FIGURE 11 requiring only two SCR's.

The circuit shown in FIGURE 12 of the drawings is similar to the circuit in FIGURE 11 with the exception that the need for a third SCR 85 is obviated by the inclusion of an additional selector switch 88 having a two-way throw. With this arrangement the common connected collector electrodes of the two load currents carrying SCR's 11 and 11′ may be connected across the series connected load 26 and filter inductance 27 when switch 88 is thrown to its upper contact, or may be connected directly to power supply terminal 14 when the switch 88 is thrown to its lower contact. In addition an on-off switch 87 is included in the connection of the first and second rectifying diodes 25 and 28 to load 26 and filter inductance 27. By fabricating the circuit in this manner, it is possible to do away with the need for the third auxiliary silicon controlled rectifier 85 used in the circuit arrangement of FIGURE 12 and still obtain a wide range of voltage control.

Upon closing the switch 88 to its lower contact and closing switch 87, the circuit of FIGURE 12 will operate in its high voltage mode of operation. While operating in this mode, voltage control may be achieved by appropriate variation of the relative conduction intervals of the two load current carrying SCR's 11 and 11′ in accordance with the above described time ratio control principles. When it is desired to operate at higher voltages the periods of conduction of the two valves are allowed to overlap as discussed previously in more detail in connection with FIGURE 10. If it is desired to operate over a low voltage range, the switch 88 is closed on its upper contact and the on-off switch 87 is opened so that either one or both of the SCR's 11 and 11′ may then be used to chop the current supplied to the load 26 and filter inductance 27 in a similar fashion to that described with relation to the third SCR 85 in the circuit arrangement of FIGURE 11. While the circuit arrangements of FIGURES 11 and 12 are somewhat more complex than those previously described with relation to FIGURES 7 through 10, it is possible with these circuit arrangements to control a larger load such as a fan or pump through a complete speed control range using SCR's of a given rating than otherwise could be controlled more directly with conventional time ratio control circuits.

Figure 13:
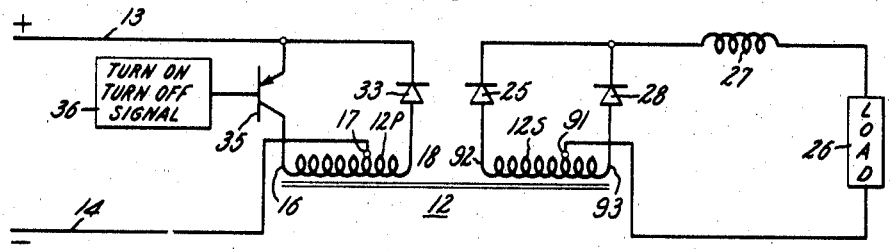
FIGURE 13 is a schematic circuit diagram of still another form of TRC power circuit constructed in accordance with the invention which employs a power transistor and a two winding transformer to provide isolation of the output load voltage from the input supply voltage source.

FIGURE 13 of the drawings illustrates an embodiment of the invention wherein the output load circuit is effectively isolated from the input circuit. This is accomplished by means of a transformer 12 having two physically separated inductively coupled windings comprised by primary winding portion 12p and secondary winding portion 12s, and having an air gap in its core for energy storage purposes. The primary winding portion 12p has an intermediate tap point 17 connected directly to one of the power supply terminals 14. A load current carrying power transistor 35 is connected in series circuit relationship with the winding portion extending between the intermediate tap point 17 and the end terminal 16 of primary winding 12p, and the series circuit thus comprised is connected across the remaining power supply terminal 13. The feedback diode 33 is connected in series circuit relationship with the remaining turns from point 17 to 18 of the primary winding portions 12p, and the series circuit thus comprised is connected in parallel circuit relationship across the power supply terminals 13 and 14 in parallel with the first-mentioned series circuit. The source of turn-on, turn-off gating signals is connected to the base electrode of the power transistor 35 for switching this transistor on and off at a desired rate in accordance with TRC principles.

The secondary winding portion 12s has one end terminal 92 connected through a first load current rectifying diode 25 so as to effectively couple the turns of secondary winding 12s extending between the intermediate tap point 91 and end terminal 92 across the series connected load 26 and filter inductance 27. The remaining turns of secondary winding 12s between tap off point 91 and end terminal 93 are coupled across the series connected load and filter inductance 27 by means of a second load current rectifying diode 28.

In operation, the circuit in FIGURE 13 will function in substantially the same manner as the circuit shown in FIGURES 1 and 2 wherein during conducting intervals of the power transistor 35, a secondary current flow is induced into secondary winding portion 12s which is coupled through diode 25 across load 26 and filter inductance 27. During the nonconducting intervals of the power transistor 35, the collapsing lines of magnetic flux in two-winding transformer 12 induces a reset voltage in the primary winding portion 12p that is limited by feedback diode 33 to the value of the supply voltage source $E_s$. This reset voltage also appears across the portion of the secondary winding 12s from tap-off point 91 to the end terminal 93, and is supplied through the second load current rectifying diode 28 across load 26 and filter inductance 27. Because the secondary winding 12s does operate during the reset or nonconducting intervals of the power transistor 35 to supply current to load 26, the filter inductance 27 need not be a substantial reactor for circuits where the load voltage is high relative to the supply voltage values. For other circuit applications where the load voltage values will be low relative to the supply voltage, the filter inductance 27 need only be large enough to provide the desired filtering of the load current. From this description, it can be appreciated that the circuit of FIGURE 13 operates substantially in the same manner to the autotransformer embodiments of the invention disclosed heretofor, but in addition provide effective isolation between the output load voltage and the input power source.

Figure 14:
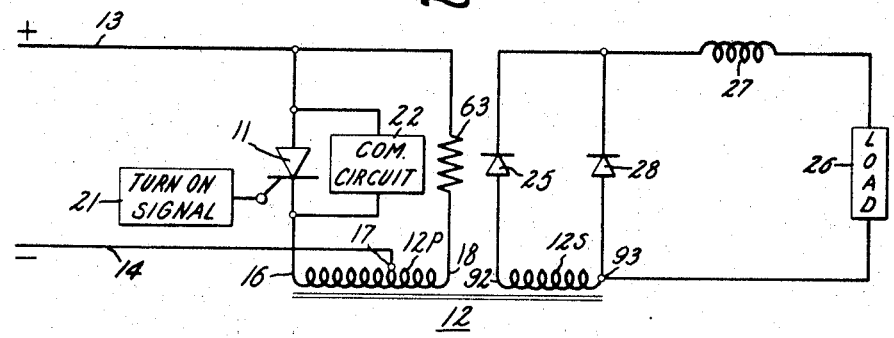
FIGURE 14 is a schematic circuit diagram of a modified version of the circuit shown in FIGURE 13 which employs an SCR.

The circuit configuration shown in FIGURE 14 of the drawings is similar to that shown in FIGURE 13 with the exception that a load current carrying silicon controlled rectifier 11 is employed in place of the power transistor 35, a resetting resistor 63 is connected in place of the feedback diode 33. Additionally, a two-winding transformer 12 is employed in the circuit which has a closed magnetic circuit (i.e. no air gap) that provides a low reluctance magnetic path so that flux decay and flux reversal in the transformer can be obtained by only a small current flowing through the resetting resistor 63. In addition, the second load current rectifying diode 28 is connected to the end terminal 93 of the secondary winding portion 12s so that in fact it operates as a coasting rectifier. Construction of the circuit in this manner makes possible considerable economy on the transformer employed; however, the filter inductance 27 employed must be a substantial reactor since it is necessary that it supply current to the load 26 during the nonconducting intervals of the load current carrying SCR 11 in order to obtain a filtered output substantially as good as that obtained with the circuit of FIGURE 13.

In operation load current carrying SCR 11 is turned on by its turn-on signal source 21 and turned off by its commutation circuit 22 at a rate determined by the proportionally controlled power to be supplied to load 26 in accordance with the TRC principle. During the conducting intervals of SCR 11 a voltage is induced in secondary winding portion 12s which is coupled by the first diode rectifier 25 across load 26 and filter inductance 27. Upon the SCR 11 being turned off by commutation circuit 22, the core of two-winding transformer 12 is reset by the current flowing through the resetting resistor 63. This esetting current is not so substantial as to interfere with the load circuit 26. Simultaneously with this resetting action, the load current is circulated through the load 26 from the filter inductance 27 by the second load current rectifying diode 28 which operates as a conventional coasting rectifier.

Figure 15:
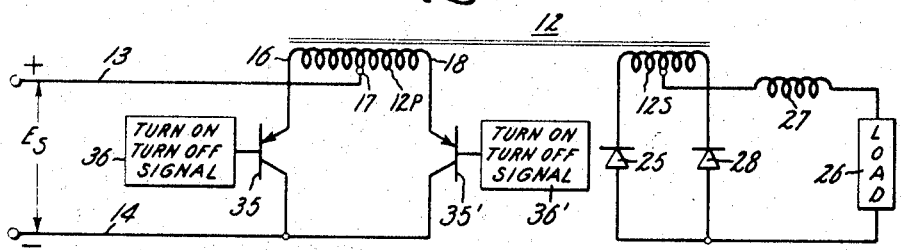
FIGURE 15 is a schematic circuit diagram of a new and improved TRC power circuit which employs a two winding transformer and two power transistors as the conductivity controlled conducting devices.

FIGURE 15 of the drawings illustrates a version of the new and improved time-ratio control power circuit constructed in accordance with the invention which employs a two-winding transformer having its output isolated from its input, and two conductivity controlled conducting devices comprised by power transistors 35 and 35' which are utilized to provide time-ratio control of the output power supplied to the load 26. The circuit configuration of FIGURE 15 is in many respects similar to the circuit of FIGURE 13 with the exception that a second load current carrying power transistor 35' and its associated turn-on, turn-off signal source 36' is substituted in place of the feedback diode 33 employed in the circuit arrangement of FIGURE 13.

In operation, it is anticipated that the two-power transistors 35 and 35' would be operated sequentially in a push-pull manner to develop either a stepped up current or a stepped up load voltage across the load 26 depending upon the number of turns in the secondary windings relative to the number of turns in the primary winding as explained previously. Variable control over the value of this stepped up current or voltage can be achieved by varying the ratio of the on-time to the off-time of the power transistors 35 and 35' in accordance with previously discussed TRC principles. In all other respects, the circuit of FIGURE 15 operates in a manner similar to the circuit of FIGURE 7 and, in addition, provides a little closer control over the value of the output load voltage supplied to load 26.

Figure 16:
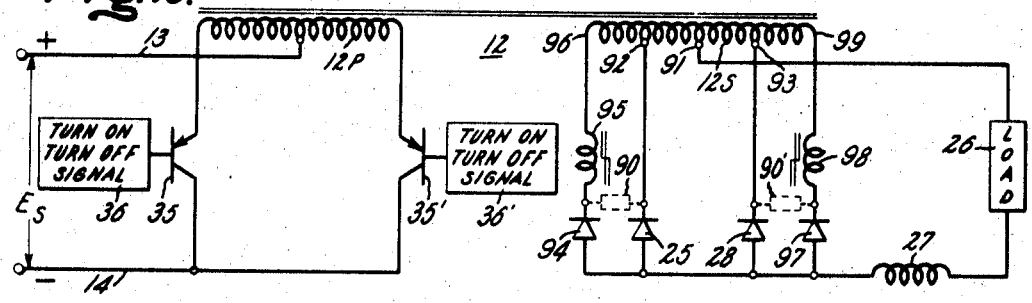
FIGURE 16 is a schematic circuit diagram of a variation of the circuit of FIGURE 15 wherein small saturable core reactors are employed to change the transformer turns ratio during operation of the circuit to thereby achieve a wider output load voltage control.

The circuit shown in FIGURE 16 of the drawings is essentially the same as the FIGURE 15 circuit with the exception that means are incorporated in the circuit to change the effective turns ratio of the transformer during operation of the circuit by merely altering the relative conducting intervals of the power transistors 35 and 35' or varying the frequency at which the circuit operates. In the circuit shown in FIGURE 16, the portion of the circuit associated with the primary winding half 12p of the two-winding transformer 12 is identical to the circuit shown in FIGURE 15. The secondary portion of the circuit differs, however, in that the first and second load current rectifying diodes 25 and 28 are connected to tap points 92 and 93 on the secondary winding portion 12s, both of which are between the intermediate tap-off point 91 to which the series connected load 26 and filter inductance 27 are connected, and the two end terminals 96 and 99, respectively. The end terminal 96 of secondary winding portion 12s is effectively connected through a third load current rectifying diode 94 and small saturable reactor 95 to the load elements 26 and 27, and the end terminal 99 is effectively connected to the load circuit through a fourth load current rectifying diode 97 and series connected small saturable reactor 98. By this arrangement, it is possible to effectively couple and decouple the additional turns between tap-off point 92 and end terminal 96 of secondary winding portion 12s into and out of circuit relationship with the load elements 26 and 27 by varying the period of conduction of the power transistor 35. If the conduction interval of transistor 35 is extended sufficiently, it will allow the small saturable reactor 95 to saturate, and hence, couple the additional winding turns into the circuit. Similarly, the additional turns between the tap-off points 93 and 99 of secondary winding portion 12s can be coupled into and out of circuit relationship with load 26 and filter inductance 27 by extending the period of conduction of the power transistor 35' sufficiently long to drive the small saturable reactor 98 into saturation, Thus, it is possible to change the effective turns ratio of the secondary winding portion 12s of transformer 12 during operation of this circuit merely by lowering the frequency of operation to a sufficiently low value, and allowing each valve 35 and 35' to conduct for one-half the time to thereby drive the small saturable reactors 95 and 98 into saturation, When thus operated the circuit provides highest output voltage because of the increased turns. To operate the circuit at low voltage, the conducting intervals of 35 and 35' are made sequential at some higher frequency of operation (dependent upon the output power desired) in accordance with the previously TRC principles similar to the circuit shown in FIGURE 15. It should also be noted that the circuit could employ small bias windings or resistors, such as are shown in dotted lines at 90 and 90' for obtaining a resetting current flow through the small saturable reactors 95 and 98.

Figure 17:
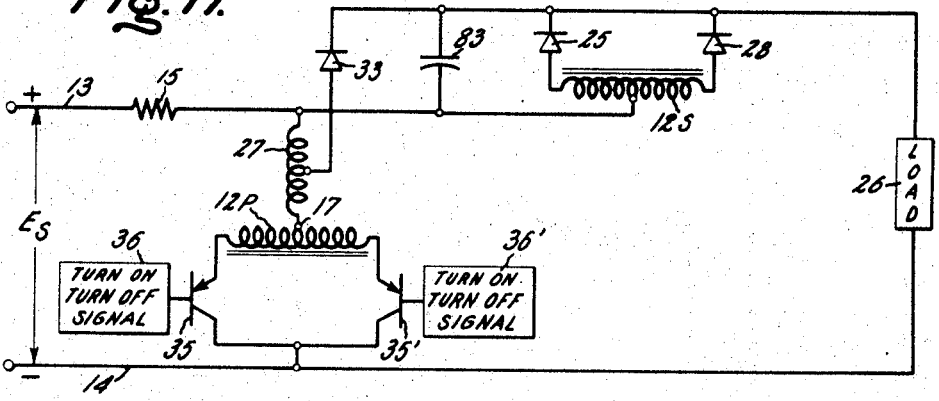
FIGURE 17 is a schematic circuit diagram of a TRC constructed in accordance with the invention which employs a two winding transformer and two conductivity controlled conducting devices but does not provide isolation between the input and output circuits.

The circuit arrangement of FIGURE 17 effects a boost in the output voltage in a manner similar to the circuit arrangement shown in FIGURE 10 of the drawings but differs from the FIGURE 10 circuit in that it employs a two-winding transformer having two physically separated inductively coupled primary and secondary winding portions 12p and 12s, respectively. In the circuit arrangement of FIGURE 17, a filter inductance 27 is connected between power supply terminal 13 and intermediate tap point 17 on the primary winding portion 12p of the two winding transformer. An intermediate tap point on the filter inductance 27 is connected through a feedback rectifier 33 and load 26 back to the remaining power supply terminal 14. For filtering purposes, capacitor 83 is connected in parallel circuit relationship with each of the winding halves of secondary winding portion 12s and their respective series connected first and second load current rectifying diodes 25 and 28. The circuit is especially useful for boosting the output load voltage above the power supply voltage.

In operation, for only a small boost in the output voltage, the load current carrying power transistors 35 and 35' are turned on and off sequentially in a push-pull manner to provide time-ratio control of the output load voltage. During operation in this manner, some of the output load current is supplied to load 26 through transformer windings 12p and 12s, and some is supplied through diode 33. As the transistors 35 and 35' are turned on for greater and greater periods (still sequentially), more and more of the output energy is supplied through transformer windings 12p and 12s. If the two valves 35 and 35' are allowed to conduct over 180° each so that there is an overlap in their conducting periods, substantial energy will be stored in the inductance 27. Thereafter, upon one of the valves 35 or 35' being turned off, this stored energy will be transferred into the load through one-half of the primary winding 12p at a considerable step-up in voltage. As a result, it can be appreciated that the circuit provides good control over a wide range of output voltage values, and good utilization of the components of the circuit. Also, because of its design, the circuit has low transients which is desirable for some types of loads. With the circuit, maximum voltage will occur when each of the valves 35 and 35' are on for more than one-half of the time so that overlap occurs in their periods of conduction. Minimum output voltage will be obtained when the power transistors 35 and 35' operate sequentially for only a short period, that is a few degrees of each cycle.

Figure 18:
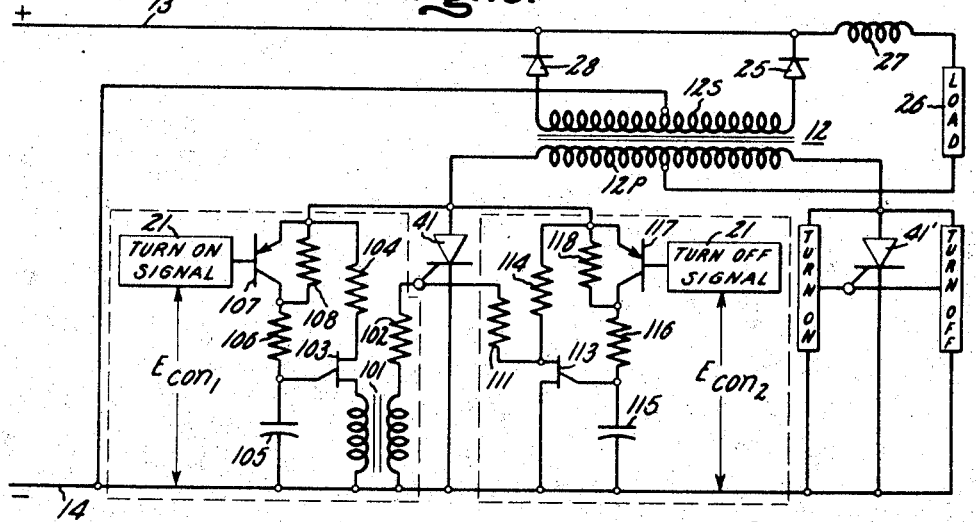
FIGURE 18 is a schematic circuit diagram of still another form of TRC power circuit constructed in accordance with the invention which employs a two winding transformer and two conductivity controlled conducting devices, but similarly does not allow for complete isolation between the input and output circuits.

FIGURE 18 of the drawings illustrates a version of the invention wherein the time-ratio control valves 41 and 41' are connected in a series circuit relationship with the load 26 and filter inductance 27 to achieve a load voltage reduction. For this purpose, gate turn-off silicon controlled rectifiers 41 and 41' are connected to the respective end terminals of the primary winding portion 12p of a two-winding transformer having a secondary winding 12s which is physically separated from and inductively coupled to the primary winding portion 12p. A fired load current diode rectifier 25 is operatively connected between one end terminal of the secondary winding 12s and the power supply terminal 13 with the remaining end terminal of secondary winding 12s being connected through a second load current diode rectifier 28 to the same power supply terminal 13. The intermediate tap point of the secondary winding 12s is connected directly to the remaining power supply terminal 14.

By the above arrangement, it is possible to turn the GTO's 41 and 41' on and off sequentially at a sufficiently high rate so as not to saturate the core of transformer 12, and thereby inductively couple energy back to the secondary winding 12s. This energy is then fed back through either one of the two diodes 25 or 28 to power supply source $E_S$. In this summer, the load voltage reduction is achieved. However, should it be desirable to operate the circuit at the full supply voltage value, all that is required is that the frequency of operation of the GTO's 41 and 41' be increased sufficiently (assuming fixed on-time), or the intervals of conduction be extended or allowed to overlap so that the core of the transformer 12 is driven into saturation thereby effectively connecting the load 26 and filter inductance 27 across power supply source $E_S$. Turning on and off the GTO's, then will operate in much the same fashion as a flyback transformer to supply load voltage to load 26 with filtering being providing by filter inductance 27.

In addition to the above distinctions in the construction and manner of operation of the circuit arrangement of FIGURE 18, it should be noted that the FIGURE 18 circuit configuration employs gate turn-off silicon controlled rectifiers 41 and 41' having separate control over the turn-on and turn-off of the GTO's. Each of the GTO's 41 and 41' have similar turn-on and turn-off circuits and, hence, only the turn-on, turn-off circuit associated with GTO 41 will be described in detail. The GTO 41 has its control gate connected to a turn-on gating circuit comprised by a pulse transformer 101 having its secondary winding connected in series circuit relationship with a limiting resistor 102 to the control gate of GTO 41. The primary winding of pulse transformer 101 is connected to one of the base electrodes of a unijunction transistor 103 which has its remaining base electrode connected through a limiting resistor 104 to one load terminal of GTO 41. The emitter electrode of the unijunction transistor 103 is connected to the junction point of a resistance-capacitance charging network comprised by capacitor 105 and resistor 106 connected in series circuit relationship between the power supply terminal 14 and the collector electrode of a PNP junction transistor 107. A resistor 108 is connected to the one load terminal of GTO 41 in parallel circuit relationship with the emitter collector of the transistor 107 and the base of transistor 107 is connected to a suitable source of turn-on signals 21. By this arrangement, the application of a turn-on signal to the base of transistor 107 will cause it to vary the charging rate of the capacitor 105 so as to control the point at which the charge on capacitor 105 reaches a sufficient value to cause it to turn on the unijunction transistor 103. Upon unijunction transistor 103 being turned on, a current pulse will be produced in the pulse transformer 101 which is coupled to the turn-on gate of GTO 41 thereby causing it to be rendered conductive.

The gate electrode of GTO 41 is also coupled through a second voltage resistor 111 to one base electrode of a second unijunction transistor 113. This same base electrode is connected back through a limiting resistor 114 to the collector load terminal of GTO 41 and the remaining base electrode of unijunction transistor 113 is connected directly to power supply terminal 14 (and hence to the remaining emitter load terminal of GTO 41). The emitter of unijunction transistor 113 is connected to the junction point of a charging capacitor 115 and a limiting resistor 116 connected in series circuit relationship between the power supply terminal 14 and the collector electrode of a PNP transistor 117. PNP transistor 117 has its emitter electrode connected back to the collector electrode of the GTO 41 and a resistor 118 is connected in parallel circuit relationship with its emitter-collector. The base of transistor 117 is connected to a source of suitable turn-on signals 21. When it is desired to turn off the GTO 41, a turn-on signal is applied to the transistor 117 which causes transistor 117 to increase the charge on capacitor 115 to fire unijunction transistor 113. Upon unijunction transistor 113 being fired, a negative going gating pulse is applied to the gate of GTO 41 and causes it to be turned off.

Figure 19:
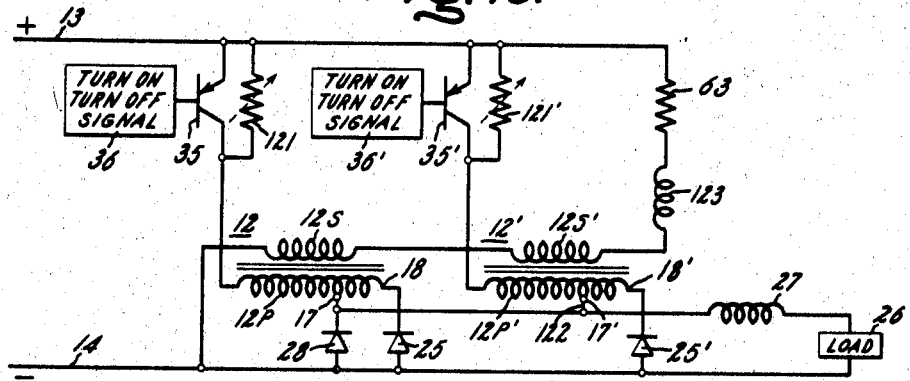
FIGURE 19 is a schematic circuit diagram of a new and improved TRC power circuit which employed two, two winding transformers and two conductivity controlled conducting devices to provide very fine voltage control over both a low voltage-high current range of output load voltages and a high voltage-low current range of load voltages.

FIGURE 19 of the drawings illustrates an embodiment of the invention wherein essentially two time-ratio control circuits supply a single load, and a single resetting circuit is employed to reset the core of the transformers of each of the two TRC circuits. By this arrangement, greater control is obtained over both the high voltage and low voltage ranges of operation of the circuit. In the embodiment of the invention shown in FIGURE 19, a power transistor 35 is operatively connected in series circuit relationship with the primary winding 12p of a first two winding transformer 12, and a first rectifying diode 25 across the power supply terminals 13 and 14. The intermediate tap point 17 of primary winding 12p is connected to the series connected filter inductance 27 and load 26 so that in effect the portion of primary winding 12p extending between tap off point 17 and end terminal 18 is connected across the series connected load 26 and filter inductance 27 through diode 25. A second diode rectifier 28 is connected between the intermediate tap off point 17 and power supply terminal 14 so that in effect it operates as a coasting rectifier for load 26 and filter inductance 27. A nonlinear resistor such as a thyrite resistor 121 is connected in parallel circuit relationship with the power transistor 35 and of course a source of turn-on, turn-off signals 36 is connected to the base of the power transistor 35.

A second time-ratio circuit included in the FIGURE 19 circuit arrangement is comprised in part by a power transformer 35', the primary winding portion 12p' of a second two winding transformer 12' and a diode rectifier 25' which are connected in series circuit relationship across power supply terminals 13 and 14. The portion of winding 12p' between 17' and 18' is connected across filter inductance 27 and load 26 in similar fashion to the first-mentioned circuit portion. It should be noted that the diode rectifier 28 is likewise connected between the intermediate tap point 17' of the second primary winding portion 12p' by reason of the interconnection 122, and hence will operate as a coasting rectifier for the second mentioned TRC circuit portion. The two secondary windings 12s and 12s' of the two transformers 12 and 12' are connected in series circuit relationship with a resetting resistor 63 and a second small inductor 123, and operate to supply a resetting circuit to the cores of each of the transformers 12 and 12'. If desired, turns ratios of the two transformers 12 and 12' employed in the circuit may be different so that one may be used for low voltage control, and the second for higher voltage control. Hence, the transformer with the greater step-up of output current may be used for large load currents at low voltage while the other circuit portion supplies the load when the higher output voltage at reduced current is required. The two nonlinear resistors 121 and 121' which comprise thyrite resistors serve to limit the reset voltage across the power transistors 35 and 35', respectively, during reset. If desired, Zener diodes can be employed in place of the thyrite resistors 121 and 121'.

It can be appreciated that the use of two transformer ratios provides a greater control over both the low voltages and high voltage modes of operation of the circuit of FIGURE 19. When it is desired to operate the circuit in a high voltage mode of operation, the periods of conduction of the two power transistors 35 and 35' are allowed to overlap so that the circuit operates as a chopper. Time-ratio control of the periods of conduction of the power transistors 35 and 35' when operating in this manner will then provide control over the amount of overlap, and hence control over the load voltage supplied to the load. If it is then desired to shift to a low voltage-high current mode, the periods of conductance of the two power transistors 35 and 35' are shifted so that they are sequential and alternate in a push-pull fashion. When operated in this manner, the periods of conduction of the two power transistors 35 and 35' are again time-ratio controlled to control the load current supplied to load 26. Maximum voltage may be obtained if the periods of conductance of the two-power transistors 35 and 35' are adjusted to provide substantial periods of conductance where the cores of the transformers 12 and 12' are driven close to saturation, and very little reset of the cores is provided during the nonconducting intervals. From this description, it can be appreciated therefore that the inclusion of the essentially two separate TRC circuits provides a means for much greater control of the load voltage during both the low voltage and high voltage modes of operation of the circuit.

Figure 20:
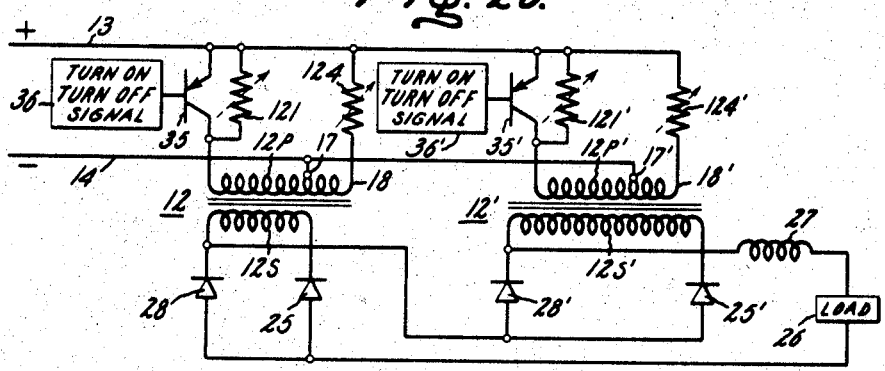
FIGURE 20 is a schematic circuit diagram of a variation of the circuit of FIGURE 18 wherein complete isolation between the input and output circuits is achieved.

FIGURE 20 of the drawings illustrates an embodiment of the invention which is substantially similar to the FIGURE 19 circuit with the exception that the two transformers 12 and 12' employed in the circuit are arranged to provide for isolation of the output circuit from the input circuit. For this purpose, the two transformers 12 and 12' have physically separated inductively coupled primary and secondary winding portions. In addition to this distinction, it should be noted that the intermediate tap point 17 on a primary winding portion 12p is connected directly to the power supply terminal 14, and that a resetting nonlinear resistor, such as a thyrite resistor 124, is connected in series circuit relationship with the remaining turns of the primary winding portion between the intermediate tap point 17 and end terminal 18 across the power supply terminals 13 and 14. The second transformer 12' has its primary winding portion similarly connected so that during the nonconducting intervals of the power transistors 35 and 35', a resetting current will flow through at least a portion of the primary winding 12p or 12p'. In addition to these distinctions, it should be noted that the two secondary winding portions 12s and 12s' are effectively connected in series circuit relationship across the series connected load 26 and filter inductance 27 through their respective first diode rectifiers 25 and 25'. During the reset or nonconducting intervals of the power transistors 35 and 35', the second diode rectifiers 28 and 28' effectively operate as coasting rectifiers.

In operation, the circuit arrangement in FIGURE 20 will function in substantially in the same manner as the circuit described with relation to FIGURE 19 of the drawings to provide a much finer control over the value of the voltages supplied to load 26 during either the low voltage-high current starting mode of operation, or during the high voltage-reduced current operating modes. Again, by time-ratio control of the turn-on, turn-off times of the power transistors 35 and 35', respectively, the value of the load voltage supplied to load 26 can be very closely controlled within the broad limits defined above while at the same time providing for complete isolation of the output circuit from the input circuit.

Figure 21:
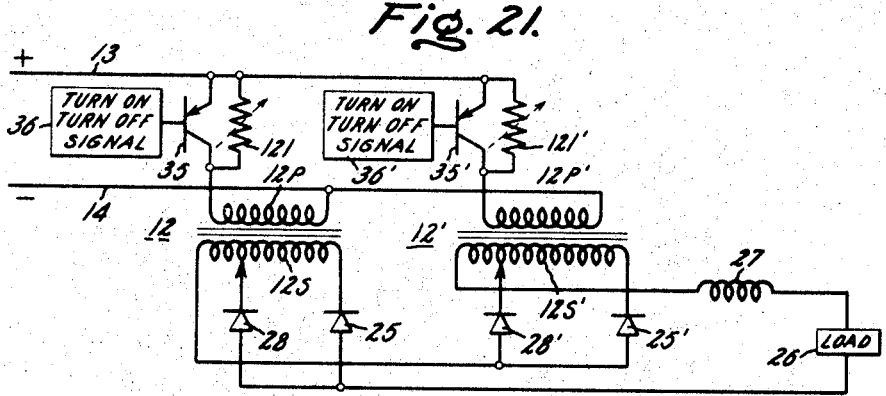
FIGURE 21 illustrates a modified form of the circuit arrangement shown in FIGURE 20 and which requires fewer SCR's.

The circuit shown in FIGURE 21 of the drawings is in many respects identical to the circuit arrangement of FIGURE 20 of the drawings in that the secondary winding portions 12s and 12s' of the two transformers are effectively connected in series circuit relationship across the load 26. The FIGURE 21 circuit differs however in the manner of connection of the second diode rectifier devices 28 and 28' in that they are connected intermediate the two end terminals of the secondary winding portions 12s and 12s'. As a result of this connection, a portion of the load current flowing in the secondary winding can be employed to reset the core of the transformers 12 and 12', respectively. In all other respects, the circuit functions in identical manner to the circuit arrangement of FIGURE 20.

Figure 22:
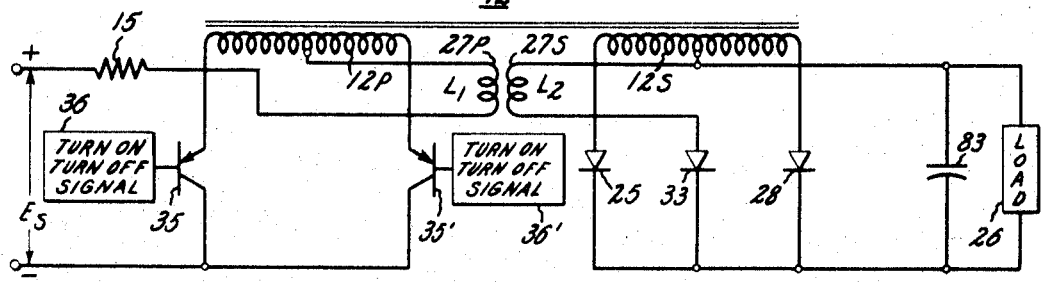
FIGURE 22 illustrates a modified form of the circuit arrangement shown in FIGURE 17 designed to provide complete isolation of the output circuit from the input.

FIGURE 22 of the drawings is similar in all respects to FIGURE 17 with the exception that it is designed to provide complete isolation of the output circuit from the input. Because the two circuits are so similar, and operate in a substantially identical fashion, a further description of FIGURE 22 is believed unnecessary.

From the foregoing description, it can be appreciated that the invention provides a whole family of new and improved time ratio controlled circuits employing transformers in the load current path which provide a variable voltage control over a wide range of output voltages and which are efficient in operation. The circuits embodying these characteristics are simple in design and relatively inexpensive to manufacture. Further, by proper design, it is possible to provide circuits capable of low voltage-high starting currents for starting traction motors, for example, which later can be shifted to high voltage-reduced current mode of operation during running of the motors. In addition to all these characteristics, the circuits can be designed to provide complete isolation between the output power and the input supply.

Having described several embodiments of new and improved transformer coupled time ratio control power circuits constructed in accordance with the invention, it is believed obvious that other modifications and variations of the invention are possible in the light of the above teachings. It is, therefore, to be understood that changes may be made in the particular embodiments of the invention described which are within the full intended scope of the invention as defined by the appended claim.

What I claim as new and desire to secure by Letters Patent of the United States is:

1. A new and improved time ratio controlled power circuit including in combination a first load current carrying conductivity controlled conducting device and the primary winding portion of an autotransformer operatively connected in series circuit relationship across a pair of power supply terminals that in turn are adapted to be connected across a source of electric potential, a second load current carrying conductivity controlled conducting device and the secondary winding portion of the autotransformer operatively connected in series circuit relationship across the pair of power supply terminals in parallel with the first mentioned series circuit, means for turning on said load current carrying conductivity controlled conducting devices to cause them to conduct, means for turning off the conductivity controlled conducting devices after desired intervals of conduction, a load, first rectifying means operatively connecting said load across a part of said primary winding portion of the autotransformer, second rectifying means operatively connecting said load across a part of the secondary winding portion of the autotransformer, further including first on-off switch means connected in series circuit relationship respectively with the first load current carrying conductivity controlled device and the primary winding portion of the autotransformer and with the second load current carrying conductivity controlled conducting device and the secondary winding of the autotransformer, a filter inductance connected in series circuit relationship with said load, second switch means through which are connected respectively, the first rectifying means and series connected load and filter inductance across a part of the primary winding portion of the autotransformer, and the second rectifying means and series connected load and filter inductance across a part of the secondary winding portion of the autotransformer, coasting rectifier means operatively connected in parallel circuit relationship with the series connected load and filter inductance, and third switch means for operatively connecting the parallel connected coasting rectifier means and series connected load and filter inductance through parallel connected primary and secondary winding portions of the autotransformer and their respective series connected first and second load current carrying conductivity controlled conducting devices across the power supply terminals.

References Cited

UNITED STATES PATENTS

| | | | |
|---|---|---|---|
| 3,015,771 | 1/1962 | Mesenheimer | 321—15 |
| 3,217,230 | 11/1965 | Hart | 321—2 |
| 3,350,620 | 10/1967 | Barron | 321—2 |

LEE T. HIX, *Primary Examiner.*

W. H. BEHA, JR., *Assistant Examiner.*

U.S. Cl. X.R.

321—45